United States Patent
Vinnik et al.

(10) Patent No.: US 9,298,824 B1
(45) Date of Patent: Mar. 29, 2016

(54) FOCUSED CRAWLING TO IDENTIFY POTENTIALLY MALICIOUS SITES USING BAYESIAN URL CLASSIFICATION AND ADAPTIVE PRIORITY CALCULATION

(75) Inventors: Alex Vinnik, Austin, TX (US); Maxim Gubin, Walnut Creek, CA (US); Oleg Kislyuk, San Ramon, CA (US)

(73) Assignee: Symantec Corporation, Mountain View, CA (US)

( * ) Notice: Subject to any disclaimer, the term of this patent is extended or adjusted under 35 U.S.C. 154(b) by 775 days.

(21) Appl. No.: 12/832,062

(22) Filed: Jul. 7, 2010

(51) Int. Cl.
*H04L 29/06* (2006.01)
*G06F 17/30* (2006.01)

(52) U.S. Cl.
CPC .................. *G06F 17/30864* (2013.01)

(58) Field of Classification Search
USPC ........................................................ 726/22
See application file for complete search history.

(56) References Cited

U.S. PATENT DOCUMENTS

| | | | |
|---|---|---|---|
| 7,080,073 B1 * | 7/2006 | Jiang et al. | |
| 2004/0064475 A1 * | 4/2004 | Maeda | G06F 17/30905 |
| 2006/0075494 A1 * | 4/2006 | Bertman | G06F 21/552 726/22 |
| 2006/0129843 A1 * | 6/2006 | Srinivasa | G06F 17/30699 713/189 |
| 2008/0244292 A1 * | 10/2008 | Kumar | G06F 9/4418 713/323 |
| 2008/0295148 A1 * | 11/2008 | Bhagwan | G06F 17/30864 726/1 |

OTHER PUBLICATIONS

Chakrabarti, Soumen, Kunal Punera, and Mallela Subramanyam. "Accelerated focused crawling through online relevance feedback." Proceedings of the 11th international conference on World Wide Web. ACM, 2002.*

* cited by examiner

*Primary Examiner* — Harris C Wang
(74) *Attorney, Agent, or Firm* — Patent Law Works LLP

(57) ABSTRACT

For each page of a set, a Bayesian classification of the URL associated with the page is performed, and a maliciousness probability is assigned to the URL based on the Bayesian classification. A traversal priority is assigned to each page of the set, the assigned traversal priorities initially directing a breadth first traversal of the set of pages. The assigned traversal priorities of a subset of the pages of the set are modified to direct higher priority traversals, responsive to the maliciousness probabilities of the URLs corresponding to the pages of the subset. Each page of the set is traversed in the order specified by the traversal priorities, and analyzed during traversal to determine whether the page is malicious.

15 Claims, 4 Drawing Sheets

FOCUSED CRAWLING TO IDENTIFY POTENTIALLY MALICIOUS SITES USING BAYESIAN URL CLASSIFICATION AND ADAPTIVE PRIORITY CALCULATION

TECHNICAL FIELD

This disclosure pertains generally to computer security, and more specifically to using focused crawling to identify potentially malicious sites based on Bayesian classification of URLs and adaptive priority calculation.

BACKGROUND

The exploding growth of the Internet poses an enormous challenge in detecting malicious web pages. A very large number of websites exists, and many more new sites and pages are being launched on a regular basis. It is a huge job to analyze all of the pages of all of these websites to detect those that are malicious (e.g., those that distribute malicious code such as computer viruses, worms, Trojan horses, etc. and those that attempt to glean personal information for malicious purposes such as identity theft). Yet, the growing Internet customer base demands full, expanded Internet coverage without sacrificing efficacy of malicious site detection. Scanning every web page of the Internet is thorough, but very slow and expensive, considering the vast number of web pages, and the frequency with which they change. Various algorithms exist for performing a full-scan of the Internet, such as, for example, scanning in a conventional breadth first order (i.e., first scan all root pages, then scan the pages at the first level of embedding, then at the second level, etc.). However, a conventional full-scan of the Internet (e.g., according to a breadth first or other conventional order) for detecting malicious pages simply leaves too many pages unanalyzed at any given time.

Focused crawling is a conventional technique which is used for mining specific data from web pages. In conventional focused crawling, web pages are analyzed out of breadth first order, based on certain pages containing desired content (i.e., the content of interest to the data mining application). The content of the sites is used to determine the focus (i.e., the order in which to analyze sites outside of a breadth first crawl). Typically, focused crawling efforts target desired content, located within benign parts of the Internet, which is not relevant to the maliciousness of a site. Some effort has been made to use focused crawling to identify malicious sites based on the presence of certain content based features of individual web pages. However, this type of focused crawling still requires at least a preliminary look at the content of the pages themselves, in order to determine which pages have content indicative of maliciousness and thus worthy of priority analysis. Conducting even a preliminary analysis of the content of each web page is expensive. Additionally, the content based features indicative of a site being possibly malicious can vary with a frequency beyond that which can be matched with manually updated analysis tools, as the malicious parties behind these sites regularly change their strategy to remain undetected. Thus, efforts to identify sites indicative of maliciousness based on site content are only as effective as they are current, and the factors indicative of malicious content change frequently.

It would be desirable to address these issues.

SUMMARY

A URL focused crawling system uses Uniform Resource Locators ("URLs") to focus a traversal order in which to analyze a set of pages for maliciousness. A Bayesian classifier is trained on a set of URLs known to correspond to actual malicious pages and a set of URLs known to correspond to actual benign pages. For each specific page of the set, a Bayesian classification of the URL associated with the specific page is performed, and a maliciousness probability is assigned to the URL based on the Bayesian classification. A traversal priority is assigned to each specific page of the set, the assigned traversal priorities initially directing a breadth first traversal of the set of pages. The assigned traversal priorities of a subset of the pages of the set are modified to direct higher priority traversals, responsive to the maliciousness probabilities of the URLs corresponding to the pages of the subset. This traversal priority modification can comprise determining a specific number of pages for which to modify the traversal priorities, and defining that number of pages corresponding to URLs with the highest maliciousness probabilities as members of the subset. The traversal priorities for the pages of the subset can then be modified to equal the highest traversal priority assigned to any page. Each specific page of the set is traversed in the order specified by the traversal priorities, and analyzed during traversal to determine whether the specific page is malicious. As the pages are analyzed during traversal, some pages are determined to be benign, whereas others are determined to be malicious. In response to determining that a given page is malicious, an alert concerning the malicious page can be transmitted to a central security server.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
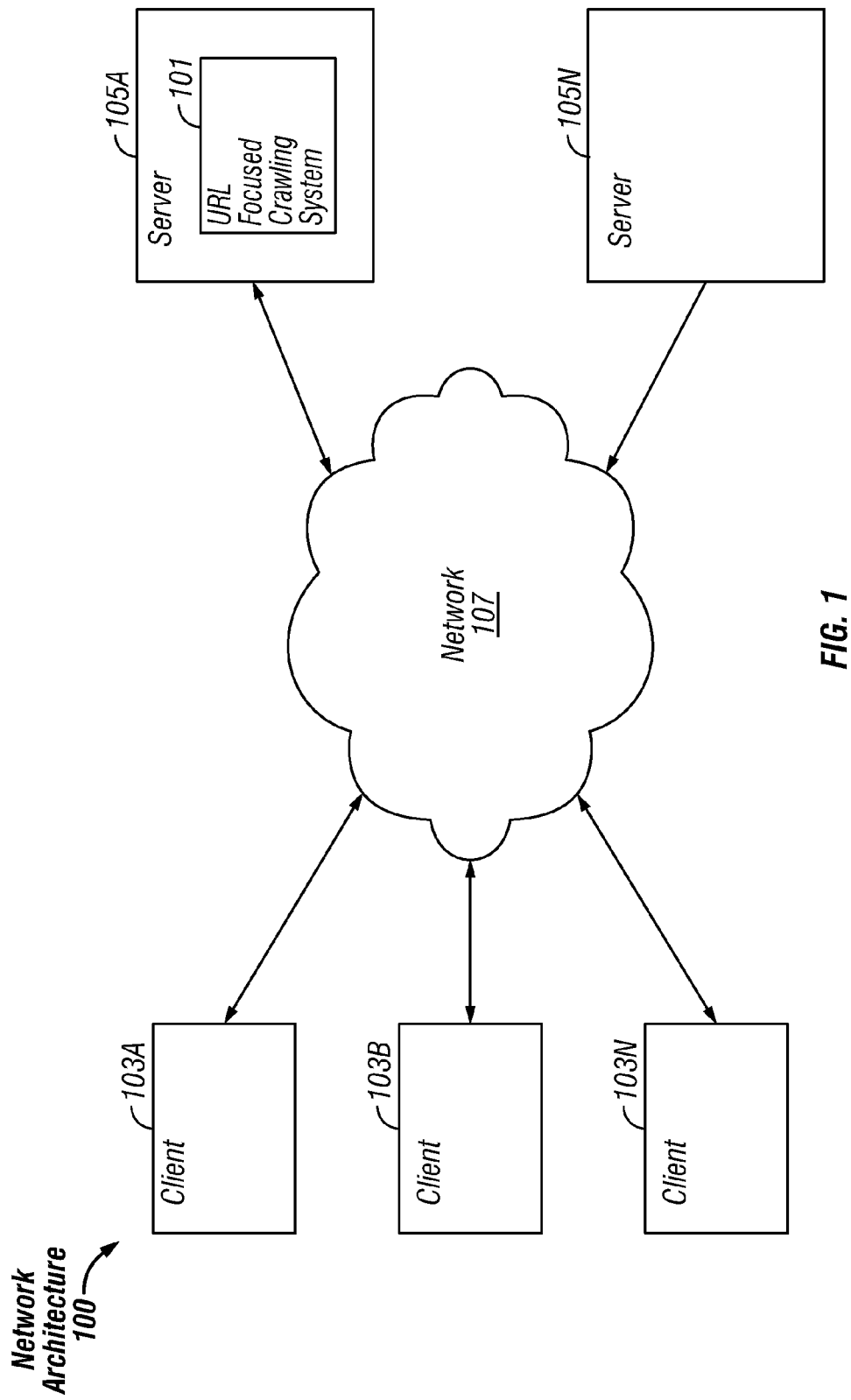
FIG. 1 is a block diagram of an exemplary network architecture in which a URL focused crawling system can be implemented, according to some embodiments.

FIG. 1 is a block diagram illustrating an exemplary network architecture 100 in which a URL focused crawling system 101 can be implemented. The illustrated network architecture 100 comprises multiple clients 103A, 103B and 103N, as well as multiple servers 105A and 105N. In FIG. 1, the URL focused crawling system 101 is illustrated as residing on server 105A. It is to be understood that this is an example only, and in various embodiments various functionalities of this system 101 can be instantiated on a client 103, a server 105 or can be distributed between multiple clients 103 and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applicants and/or data on servers 105 using, for example, a web browser or other client software (not shown).

Although FIG. 1 illustrates three clients and two servers as an example, in practice many more (or fewer) clients 103 and/or servers 105 can be deployed. In one embodiment, the network 107 is in the form of the Internet. Other networks 107 or network-based environments can be used in other embodiments.

Figure 2:
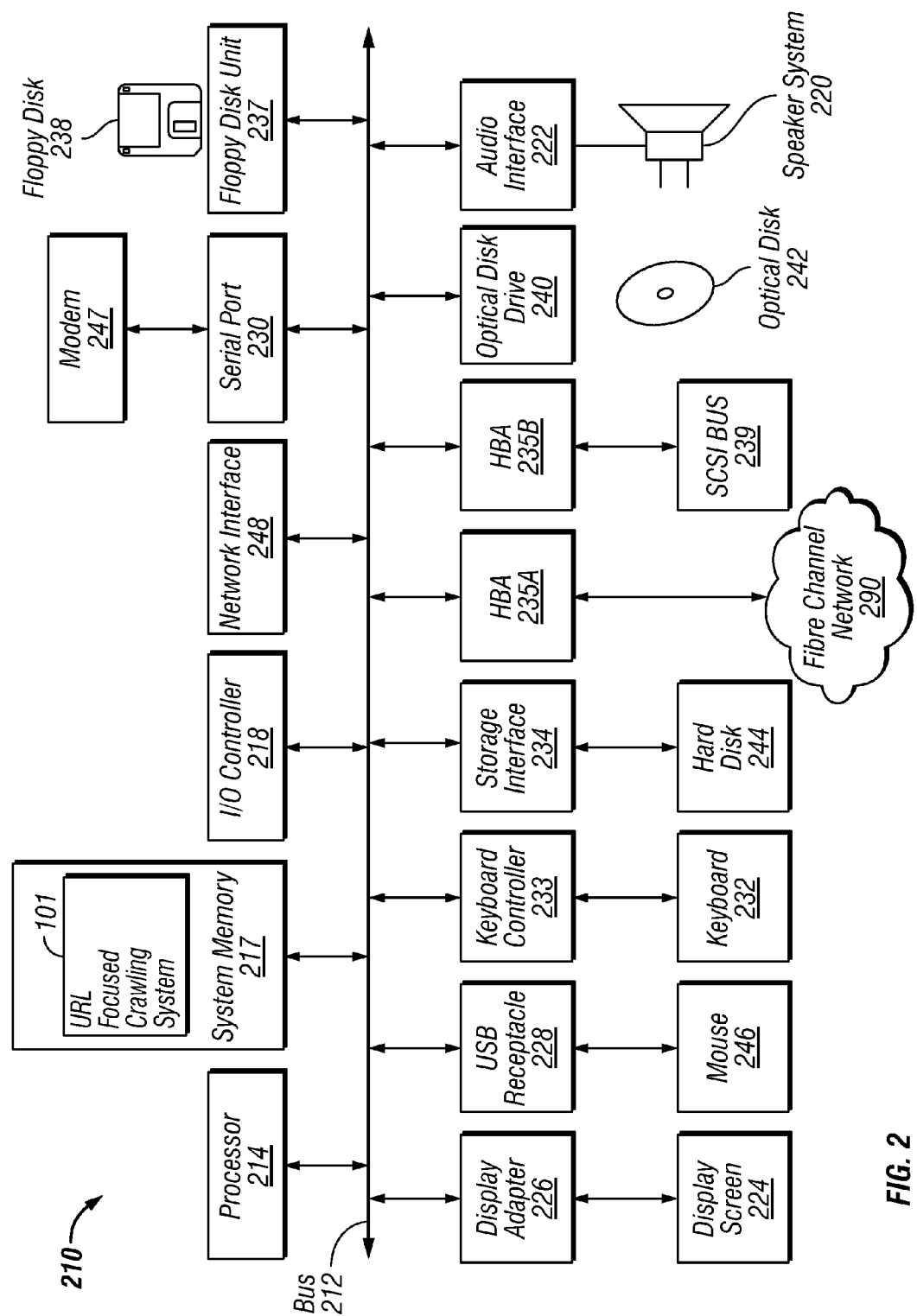
FIG. 2 is a block diagram of a computer system suitable for implementing a URL focused crawling system, according to some embodiments.

FIG. 2 is a block diagram of a computer system 210 suitable for implementing a URL focused crawling system 101. Both clients 103 and servers 105 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker system 220, a display adapter 226 communicatively coupled to an external video output device such as a display screen 224, one or more interfaces such as serial ports 230, Universal Serial Bus (USB) receptacles 230, parallel ports (not illustrated), etc., a keyboard controller 233 communicatively coupled to a keyboard 232, a storage interface 234 communicatively coupled to at least one hard disk 244 (or other form(s) of magnetic media), a floppy disk drive 237 configured to receive a floppy disk 238, a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB receptacle 228, a modem 247 coupled to bus 212, e.g., via a serial port 230, and a network interface 248 coupled, e.g., directly to bus 212.

Other components (not illustrated) may be connected in a similar manner (e.g., document scanners, digital cameras, printers, etc.). Conversely, all of the components illustrated in FIG. 2 need not be present. The components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the URL focused crawling system 101 is illustrated as residing in system memory 217. The workings of the URL focused crawling system 101 are explained in greater detail below in conjunction with FIGS. 3.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

Figure 3:
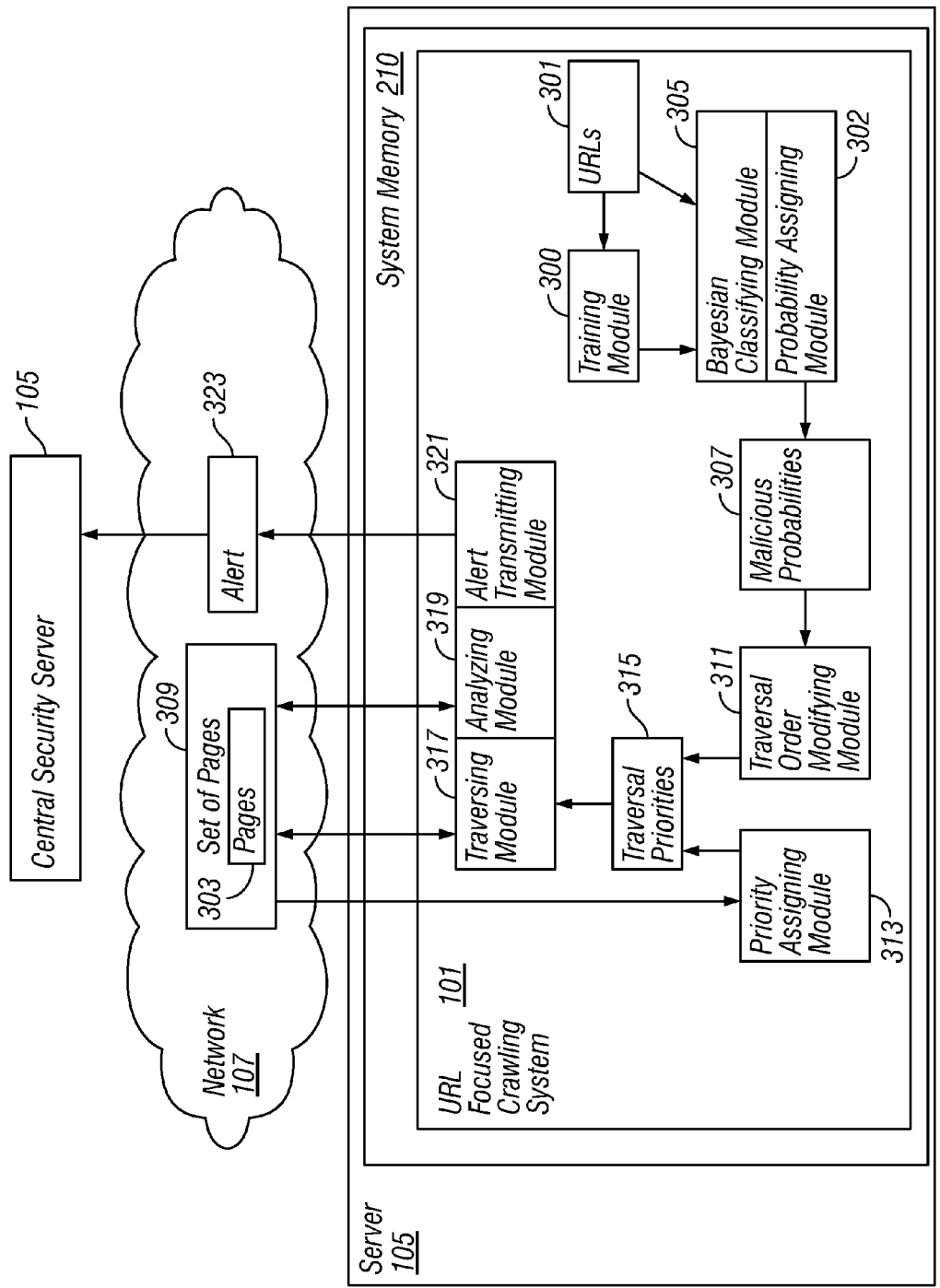
FIG. 3 is a block diagram of the operation of a URL focused crawling system, according to some embodiments.

FIG. 3 illustrates the operation of a URL focused crawling system 101, residing in the system memory 217 of a computer system 210 according to some embodiments. As described above, the functionalities of the URL focused crawling system 101 can reside on a client 103, a server 105, or be distributed between multiple computer systems 210, including within a cloud-based computing environment in which the functionality of the URL focused crawling system 101 is provided as a service over a network 107. It is to be understood that although the URL focused crawling system 101 is illustrated in FIG. 3 as a single entity, the illustrated URL focused crawling system 101 represents a collection of functionalities, which can be instantiated as a single or multiple modules as desired (an instantiation of specific, multiple modules of the URL focused crawling system 101 is illustrated in FIG. 3). It is to be understood that the modules of the URL focused crawling system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the URL focused crawling system 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

As illustrated in FIG. 3, the URL focused crawling system 101 leverages the discovery that URLs 301 have been found empirically to be indicative of the potential maliciousness of the corresponding pages 303. In other words, a URL 301 is indicative as to whether the page 303 pointed to by the URL 301 is malicious. A URL 301 contains much less content than the page 303 to which it corresponds, so it is much faster to analyze. The full path of a URL 301 typically comprises just a directory name (or names) and a site name, whereas the corresponding page 303 itself can comprise large amounts of substantive data.

A training module 300 of the URL focused crawling system 101 trains a Bayesian classifying module 305 of the URL focused crawling system 101 on benign and malicious sets of URLs 301. More specifically, the Bayesian classifying module 305 comprises a Bayesian classifier (e.g., an N-gram based classifier) which is trained to classify URLs 301 as being associated with a benign page 303 or a malicious page 303 within a given percentage of likelihood, herein called a maliciousness probability 307. By employing conventional training of the Bayesian classifying module 305 on a set of URLs 301 known to correspond to actual malicious pages 303 and a set of URLs 301 known to correspond to actual benign pages 303, the Bayesian classifying module 305 is trained to classify any URL 301 as corresponding to a malicious or benign page 303, for assignment of a maliciousness probability 307 to the classified URL 301 with a degree of accuracy sufficient for the purposes described in more detail below.

For each member of a set 309 of pages 303 to be analyzed for maliciousness, the corresponding URLs 303 are classified by the Bayesian classifying module 305 as corresponding to a malicious or benign page 303. The content of each URL 301 is used for its classification by the Bayesian classifying module 305, using, e.g., URL 301 4-grams as features. It is to be understood that in other embodiments, values for N other than 4 can be used, as well as other forms of Bayesian classification. Based on the Bayesian classification, a probability assigning module 302 of the of the URL focused crawling system 101 assigns a specific maliciousness probability 307 to the URL 301. Thus, the maliciousness probabilities 307 are determined based on only the URLs 301 without examining the content of corresponding pages 303, which is much faster than processing the underlying page 303 content itself. It is to be understood that in practice, in order to assign a maliciousness probability 307 to a URL 301, the maliciousness probability 307 can be associated with the URL 301 directly, with the page 303 corresponding to the URL 301, or associated with the URL 301 in other ways as desired. It is to be further understood that the set 309 of pages 303 to be analyzed for maliciousness can be as large or small as desired, but in general comprises a large amount of web content (e.g., many websites each comprising multiple pages 303 at multiple levels of embedding), where a conventional crawl through each page 303 would be slow enough to result in problems of the type described above.

A traversal order modifying module 311 of the URL focused crawling system 101 uses the maliciousness probabilities 307 assigned to URLs 301 to modify the order used in what would otherwise be a conventional breadth first traversal of the set 309 of pages 303 to be analyzed for maliciousness. More specifically, a priority assigning module 313 of the URL focused crawling system 101 assigns a traversal priority 315 to each page 303 of the set 309 to be analyzed, the traversal priorities 315 initially directing a conventional breadth first crawl of the pages 303. For example, pages 303 pointed to by root URLs could be assigned a traversal priority 315 of 0, pages 303 pointed to by first level embedded URLS a traversal priority 315 of −1, pages 303 pointed to by second level embedded URLs a traversal priority 315 of −2 and pages 303 pointed to by third or higher level embedded URLs a traversal priority 315 of −3, with 0 being the highest traversal priority 315 (these specific values and embedding levels are simply an example of an assignment scenario directing a breadth first traversal). It is to be understood that in practice, in order to assign a traversal priority 315 to a page 303, the traversal priority can be associated with the page 303 directly, with the URL 301 pointing to the page 303, or associated with the page 303 in other ways as desired. In any case, analyzing the pages 303 according to such an assignment of traversal priorities 315 would result in all root level pages 303 being analyzed first, then all first level embedded pages 303, then all second level embedded pages 303, etc., in a conventional breadth first order.

To account for the assigned maliciousness probabilities 307 based on the classification of the URLs 301, the traversal order modifying module 311 can modify the traversal priorities 315 of those pages 303 corresponding to the URLs 301 with the highest maliciousness probabilities 307. More specifically, for a given number of URLs 301 with the highest maliciousness probabilities 307, the traversal order modifying module 311 modifies the traversal priorities 315 of the corresponding pages 303 to the highest value (e.g., 0). The specific number of pages 303 for which to set the traversal priorities 315 to the highest value is a design parameter. Typically, the traversal priorities 315 are modified for a given number, herein called n, of pages 303 corresponding to the n URLs 301 with the n highest maliciousness probabilities 307, wherein the value to use for n is a variable design parameter that can be adjusted up and down in different embodiments, according to, for example, the distribution of maliciousness priorities 307 within the set 309, thereby supporting a variable tradeoff between focused crawling and breadth first crawling, as described below.

The adjusting of these traversal priorities 315 alters the order of what would otherwise by a standard breadth first traversal of the set 309, such that the pages 303 of the set 309 adjudicated to have the highest probability of being malicious based on their association with URLs 301 with the highest maliciousness probabilities 307 are given the highest level of traversal priority 315 and analyzed outside of breadth first order. Because these pages 303 are more likely to be malicious, it is worthwhile to give them priority in the order in which the set 309 is crawled. In a conventional breadth first traversal, all root level pages 303 are analyzed first, then all pages 303 at the first level of embedding and so on through all levels of embedding. Here, after analyzing a given root page 303 (root pages always have the highest level of traversal priority 315), any pages 303 embedded in that root page 303 with traversal priorities 315 that have been adjusted to the highest level are analyzed before moving on to the next root page 303, but embedded pages 303 without adjusted traversal priorities 315 are left for the traversal of pages at that embedding level. Thus, by adjusting the traversal priorities 315 of pages 303 associated with the highest maliciousness probabilities 307, a balance is achieved between breadth first traversal and focusing on potentially malicious pages 303 within the set 309.

Once the traversal priorities 315 have been adjusted, a traversing module 317 of the URL focused crawling system 101 traverses the pages 303 of the set 309 according to the order of their traversal priorities 315, and an analyzing module 319 of the URL focused crawling system 101 analyzes each page 303 as it is traversed to determine whether the page 303 is malicious. It is to be understood that the analyzing module 319 can employ any combination of conventional or other techniques (e.g., signature based scanning, heuristic analysis, etc.) for detecting maliciousness when analyzing the pages 303 of the set 309. Where a given page 303 is determined to be malicious, an alert transmitting module 321 of the URL focused crawling system 101 can transmit an alert 323 or other relevant information concerning the page 303 to a central security server 105, or take additional steps as desired.

Figure 4:
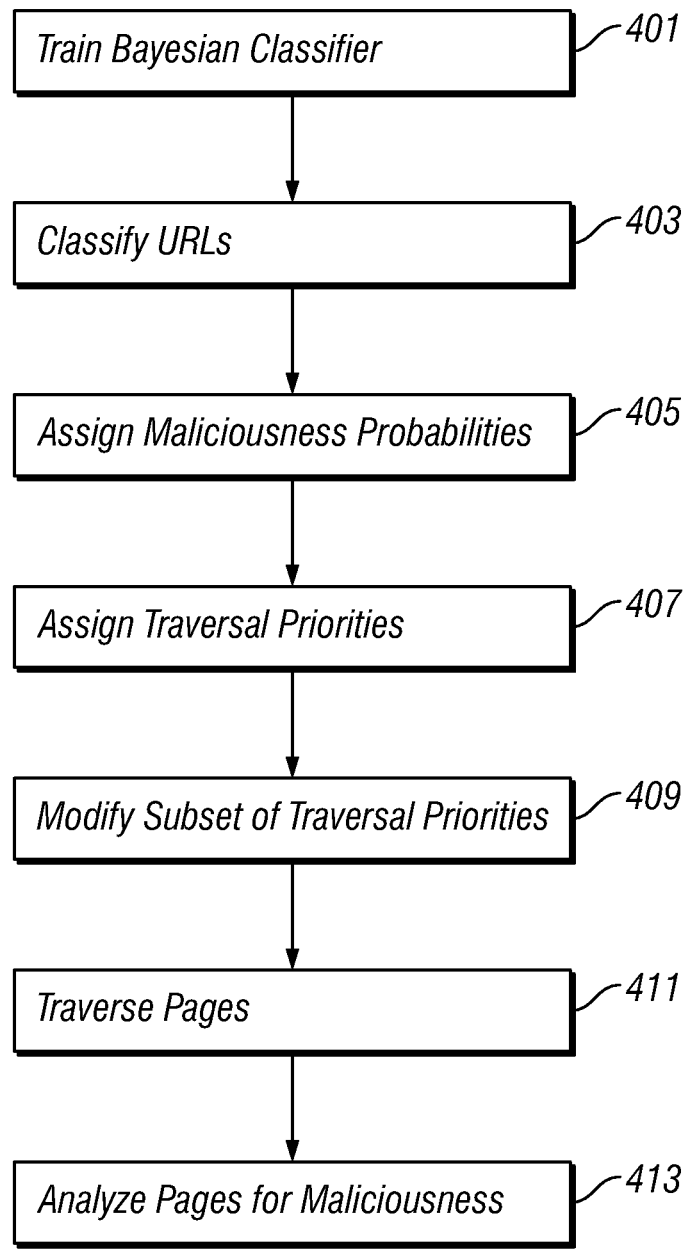
FIG. 4 is a flowchart of the operation of a URL focused crawling system, according to some embodiments.

FIG. 4 illustrates steps for the operation of a URL focused crawling system 101 (FIG. 1), according to some embodiments. The training module 300 (FIG. 3) trains 401 the Bayesian classifying module 305 (FIG. 3) on a set of URLs 301 (FIG. 3) known to correspond to actual malicious pages 303 (FIG. 3) and a set of URLs 301 (FIG. 3) known to correspond to actual benign pages 303 (FIG. 3). For each specific page 303 (FIG. 3) of the set 309 (FIG. 3), the Bayesian classifying module 305 (FIG. 3) classifies 403 the URL 301 (FIG. 3) associated with the specific page 303 (FIG. 3), and the probability assigning module 302 (FIG. 3) assigns 405 a maliciousness probability 307 (FIG. 3) to the URL 301 (FIG. 3) based on the Bayesian classification. The priority assigning module 313 (FIG. 3) assigns 407 a traversal priority 315 (FIG.

3) to each specific page 303 (FIG. 3) of the set 309 (FIG. 3), the assigned traversal priorities 315 (FIG. 3) initially directing a breadth first traversal. The traversal order modifying module 311 (FIG. 3) modifies 409 the assigned traversal priorities 315 (FIG. 3) of a subset of the pages 303 (FIG. 3) of the set 309 (FIG. 3) to direct higher priority traversals, responsive to the maliciousness probabilities 307 (FIG. 3) of the URLs 301 (FIG. 3) corresponding to the pages 303 (FIG. 3) of the subset. The traversing module 317 (FIG. 3) traverses 411 each specific page 303 (FIG. 3) of the set 309 (FIG. 3) in the order specified by the traversal priorities 315 (FIG. 3). The analyzing module 319 (FIG. 3) analyzes 413 each specific page 303 (FIG. 3) of the set 309 (FIG. 3) during the traversal, to determine whether the specific page 303 (FIG. 3) is malicious.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for expediting maliciousness analysis using focused crawling to reorder breadth first crawling when analyzing pages for maliciousness, the reordering based on fast classifications involving just page URLs (Universal Resource Locators), the method comprising:
   during a first pass of analyzing pages for maliciousness, at least one computer system:
      ordering a set of URL pages to analyze for maliciousness using a breadth first ordering which is based on proximity in a page level to a root level URL page;
   during a second pass of analyzing pages for maliciousness, the at least one computer system:
      training a Bayesian classifier with known malicious URLs and known benign URLs;
      classifying just a URL of each page, without examining the content, with a Bayesian classifier of conditional probabilities based on the training, wherein maliciousness of each page is unknown;
      assigning a maliciousness probability for each page based on the Bayesian classification of just the URL of each page;
      receiving a number of pages to represent the degree that focused crawling modifies breadth first ordering, the number of pages being a subset of the number of the set of URL pages being analyzed; and
      adjusting the ordering of breadth first with focused crawling to account for malicious probability according to the degree defined by the received number of pages,
   wherein the content of each pages is scanned according to the adjusted ordering in order to analyze the content for maliciousness.

2. The method of claim 1, further comprising:
traversing, by the at least one computer, each specific page of the set, in the adjusted ordering; and
analyzing, by the at least one computer, each specific page of the set as the specific page is traversed, to determine whether the specific analyzed page is malicious.

3. The method of claim 1, further comprising:
training, by the at least one computer, a Bayesian classifier to perform the Bayesian classification on a set of URLs known to correspond to actual malicious pages and a set of URLs known to correspond to actual benign pages.

4. The method of claim 1, further comprising:
determining, by the at least one computer, that at least one specific page of the set is malicious; and
in response to determining that the at least one specific page of the set is malicious, transmitting an alert concerning the at least one specific page to a central security server.

5. The method of claim 1, further comprising:
determining, by the at least one computer, that at least one specific page of the set is benign.

6. The computer system of claim 1, wherein modifying traversal priorities of the subset comprises said modifying being responsive to malicious probabilities only of Uniform Resource Locators without analyzing content of pages, and further comprising:
analyzing, by the at least one computer, each specific page of the set as the specific page is traversed, to determine whether the specific analyzed page is malicious responsive to content of pages.

7. At least one non-transitory computer readable storage medium storing a computer program product having software code to cause a processor to perform a method for expediting maliciousness analysis using focused crawling to reorder breadth first crawling when analyzing pages for maliciousness, the reordering based on fast classifications involving just page URLs (Universal Resource Locators), the computer program product comprising:
   during a first pass of analyzing pages for maliciousness, at least one computer system:
      ordering a set of URL pages to analyze for maliciousness using a breadth first ordering which is based on proximity in a page level to a root level URL page;
   during a second pass of analyzing pages for maliciousness, the at least one computer system:
      training a Bayesian classifier with known malicious URLs and known benign URLs;
      classifying just a URL of each page, without examining the content, with a Bayesian classifier of conditional probabilities based on the training, wherein maliciousness of each page is unknown;
      assigning a maliciousness probability for each page based on the Bayesian classification of just the URL of each page;
      receiving a number of pages to represent the degree that focused crawling modifies breadth first ordering, the number of pages being a subset of the number of the set of URL pages being analyzed; and
      adjusting the ordering of breadth first with focused crawling to account for malicious probability according to the degree defined by the received number of pages, wherein the content of each pages is scanned according to the adjusted ordering in order to analyze the content for maliciousness.

8. The computer program product of claim 7, further comprising:
program code for traversing each specific page of the set, in the adjusted ordering; and
program code for analyzing each specific page of the set as the specific page is traversed, to determine whether the specific analyzed page is malicious.

9. The computer program product of claim 7, further comprising:
program code for training a Bayesian classifier on a set of Uniform Resource Locators known to correspond to actual malicious pages and a set of Uniform Resource Locators known to correspond to actual benign pages.

10. The computer program product of claim 7, further comprising:
program code for determining that at least one specific page of the set is malicious; and
program code for, in response to determining that the at least one specific page of the set is malicious, transmitting an alert concerning the at least one specific page to a central security server.

11. A computer system to expedite maliciousness analysis using focused crawling to reorder breadth first crawling when analyzing pages for maliciousness, the reordering based on fast classifications involving just page URLs (Universal Resource Locators), the device comprising:
during a first pass of analyzing pages for maliciousness:
a traversal ordering module to order a set of URL pages to analyze for maliciousness using a breadth first ordering which is based on proximity in a page level to a root level URL page;
during a second pass of analyzing pages for maliciousness:
a Bayesian classifying module to train a Bayesian classifier with known malicious URLs and known benign URLs, the Bayesian classifying module to classify just a URL of each page, without examining the content, with a Bayesian classifier of conditional probabilities based on the training, wherein maliciousness of each page is unknown, the Bayesian classifying module to assigning a maliciousness probability for each page based on the Bayesian classification of just the URL of each page;
and
a traversal order modifying module to receive a number of pages to represent the degree that focused crawling modifies breadth first ordering, the number of pages being a subset of the number of the set of URL pages being analyzed, the traversal order modifying module to adjust the ordering of breadth first with focused crawling to account for malicious probability according to the degree defined by the received number of pages,
wherein the content of each pages is scanned according to the adjusted ordering in order to analyze the content for maliciousness.

12. The computer system of claim 11, further comprising:
means for traversing each specific page of the set, in the adjusted ordering; and
means for analyzing each specific page of the set as the specific page is traversed, to determine whether the specific analyzed page is malicious.

13. The computer system of claim 11, further comprising:
means for performing, for each specific page of the set, a Bayesian classification of the URL associated with the specific page.

14. The computer system of claim 11, further comprising:
means for training a Bayesian classifier on a set of Uniform Resource Locators known to correspond to actual malicious pages and a set of URLs known to correspond to actual benign pages.

15. The computer system of claim 11, further comprising:
means for determining that at least one specific page of the set is malicious; and
means for, in response to determining that the at least one specific page of the set is malicious, transmitting an alert concerning the at least one specific page to a central security server.

* * * * *